United States Patent [19]
Green

[11] 4,376,386
[45] Mar. 15, 1983

[54] TORQUE WRENCH TESTING DEVICES AND THE LIKE

[75] Inventor: Talmage O. Green, Schaumburg, Ill.

[73] Assignee: Precision Instruments, Inc., Des Plaines, Ill.

[21] Appl. No.: 95,294

[22] Filed: Nov. 19, 1979

[51] Int. Cl.³ .............................................. G01L 25/00
[52] U.S. Cl. ....................................................... 73/1 C
[58] Field of Search .......................................... 73/1 C

[56] References Cited
U.S. PATENT DOCUMENTS 4,608,353  9/1971  Larson ................................... 73/1 C Primary Examiner—James J. Gill
Attorney, Agent, or Firm—Hill, Van Santen, Steadman, Chiara & Simpson

[57] ABSTRACT

Multiple range calibrating apparatus for checking the accuracy of torque wrenches and other force measuring instruments comprising a mechanism for applying torque to a torque receiving element connected between the instrument being checked and a force measuring device or instrumentality. The torque receiving element is connected to the measuring device by a novel linkage that is adjustable to vary the ratio of input torque to the force applied to the measuring device so that instruments of varying capacity or calibrated in different multiple measuring scales may be tested therewith. The multiple scales on the measuring device are related to the linkage ratios so that different units of torque may be indicated. This greatly enlarges the utilization range of such testers.

12 Claims, 6 Drawing Figures

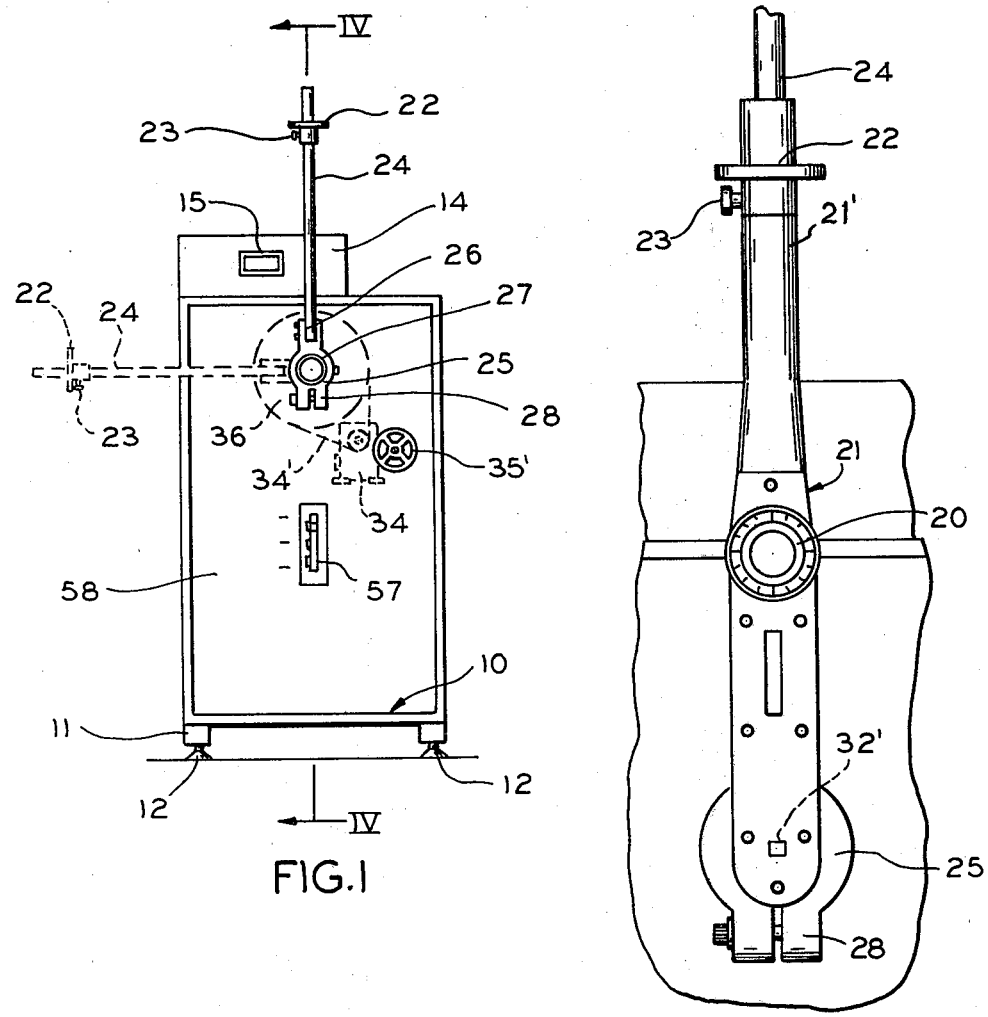
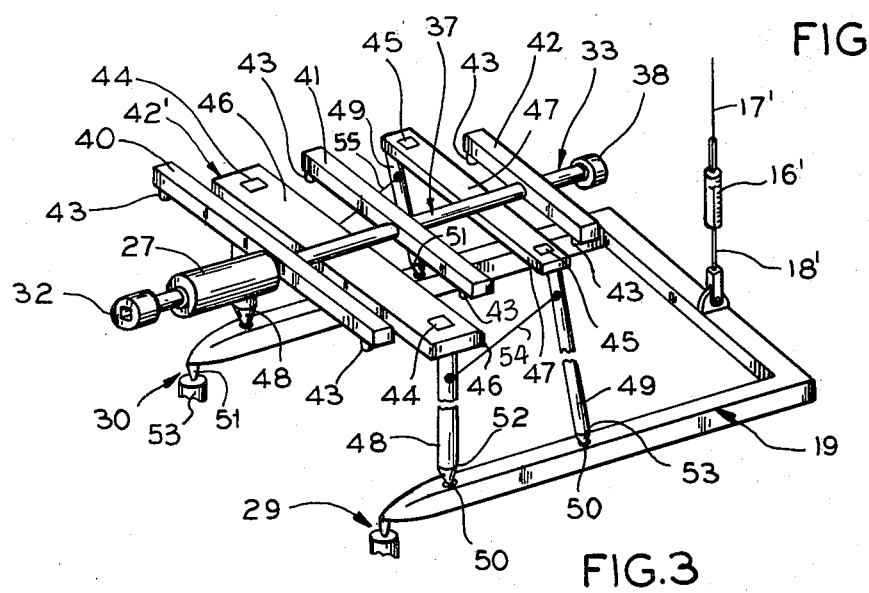
FIG.1
FIG.2
FIG.3

TORQUE WRENCH TESTING DEVICES AND THE LIKE

This invention relates to measuring instrument testers and more particularly to multiple scale and capacity testers, for testing and checking measuring devices such as torque wrenches and the like, although features thereof may be employed with equal advantage for other purposes. This invention is an improved testing device of the type shown, described and illustrated in U.S. Pat. Nos. 3,255,624 and 3,608,353 issued June 14, 1966 and Sept. 28, 1971, respectively.

It contemplates more especially the provision of instrumentalities in combination with any suitable calibrated apparatus such as an accurate weighing scale, to directly measure loads or adapt measuring devices to be tested such as torque wrenches to respond upon mechanical actuation to the calibrated standard such as a weighing scale or a transducer or both so that the load sustained by the device to be tested, will be translated to the measuring scale without introducing any inaccuracies in the translation or movement of the parts.

Most testing devices are rather intricate precision apparatus designed for a limited special purpose, and which is exceedingly expensive and does not lend itself to mass adoption. They are primarily laboratory apparatus of a scientific character that is too sensitive and involved for the average shop attendant to use with any degree of dispatch for directly determining loads of different types and to check devices utilized for applying measured loads. In order to afford adequate testing of measuring devices such as torque wrenches in a factory or repair center where torque wrenches are used in numbers and to enable the average users to test their own measuring tools, a simple and comparatively inexpensive testing and checking device has been provided which has as its base a standard and easily interpreted weighing scale or transducer or both in series. By adapting mechanical actuators for the device to be tested and comparing readings thereon with the reading on an accurate measuring device such as a platform weighing scale to which the load is translated, a fast and dependable check can be made by resort to a simple and comparatively inexpensive checking apparatus.

So that testing devices of this character may be useful for multiple measuring systems and different capacity ranges of devices under test calibrated in foot pounds, Newton Metres, and inch pounds, as an example, within the same tester and for different capacities of devices under test such as torque wrenches within commonly used torque wrench capacities of 250, 500 and 750 foot pounds as selected examples to insure maximum accuracy tests for prescribed capacity ranges, a translatable and fully floatable multiple support fulcrum carriage is displaceable to react between bearing mounts to provide the desired ratio of leverage that responds directly to coordinated multiple measuring systems provided on the correspondingly calibrated dial of a weighing platform scale for instantaneous readings based upon appropriate designations on the cabinet adjacent a selection control lever provided to shift the translatable and fully floatable fulcrum carriage.

One object of the present invention is to provide an improved apparatus for checking the accuracy of measuring devices with an enlarged range of measurement systems with which torque wrenches are calibrated and used in increasing numbers in shops, repair centers and on production lines.

Another object is to provide improved floatable and translatable load translating instrumentalities to provide measured load determinations in multiple measuring systems, and to adapt such to the testing of torque wrenches and similar measuring devices calibrated in different multiple measurement systems corresponding to the accurate responses of a similarly calibrated testing platform weighing scale or the like.

Still another object is to provide simple and effective instrumentalities for actuating measuring devices such as torque wrenches and to translate the load imparted thereto for registry with a corresponding calibrated testing scale to check the accuracy thereof and to enable prompt adjustment should there be any variation.

A further object is to provide a weighing platform scale with instrumentalities for peripherally mounting and angularly actuating torque wrenches and the like thereon and checking the readings between them to determine the accuracy of the device being checked therewith at any angle of use.

A still further object is to utilize the power advantage of a reduction train of gears in conjunction with load translating instrumentalities for rendering a platform weighing scale or other measuring devices accurately responsive to a measuring device under test for directly determining in different measuring unit systems the accuracy thereof.

Still a further object is to provide an improved multiple measuring unit testing and variable capacity range checking device for measuring devices of different capacity ranges multiple measuring scales, and accomplishing these functions with novel linkage that is adjustable to vary the ratio of input torque to the force applied to the measuring instrumentalities.

An additional object is to provide an improved multiple ratio fulcrum carriage floatably mounted between the load impressing and scale measuring instrumentalities for selective position control to provide direct load testing and checking in a plurality of measuring unit systems corresponding with that of the calibrated measuring device under test thereby substantially increasing the utility range of such devices.

Other object and advantages will appear from the following description of an illustrated embodiment of the present invention.

In the drawings:

FIG. 1 is a front view in elevation of a device embodying features of the present invention.

FIG. 2 is an enlarged fragmentary front view in elevation of the wrench under test applied to its arbor to enable rotation thereof in either direction to impress a torque load thereon in a variety of angular positions.

FIG. 3 is a diagrammatic fragmentary perspective view of a fulcrum carriage to typify the movement of the linkage rather than to simulate the actual parts structurally as shown and described in succeeding figures of the drawings, the carriage being shown with its bearing mounts and fulcrums confrontable therewith for translation relative thereto to shift the position of the fulcrum to test the measuring instrument in foot pounds, inch pounds or Newton Meters depending upon the calibration of the measuring instrument under test.

Figures 4, 5:
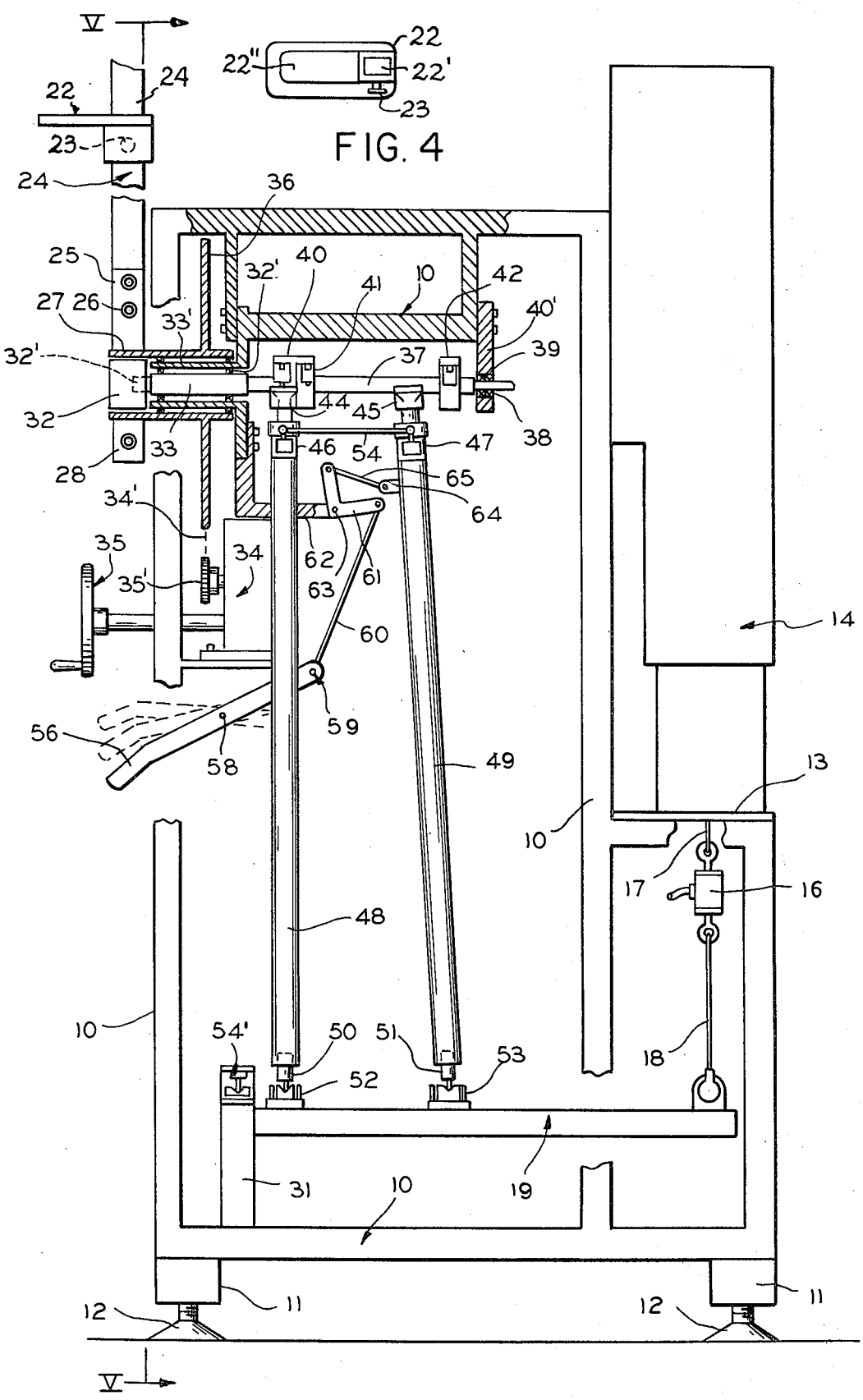

FIG. 4 is a top plan view of a bracket collar utilized in connection with the torque wrench holder bar shown in FIGS. 2 and 5.

FIG. 5 is a sectional view in elevation taken substantially along line IV—IV of FIG. 1.

Figure 6:
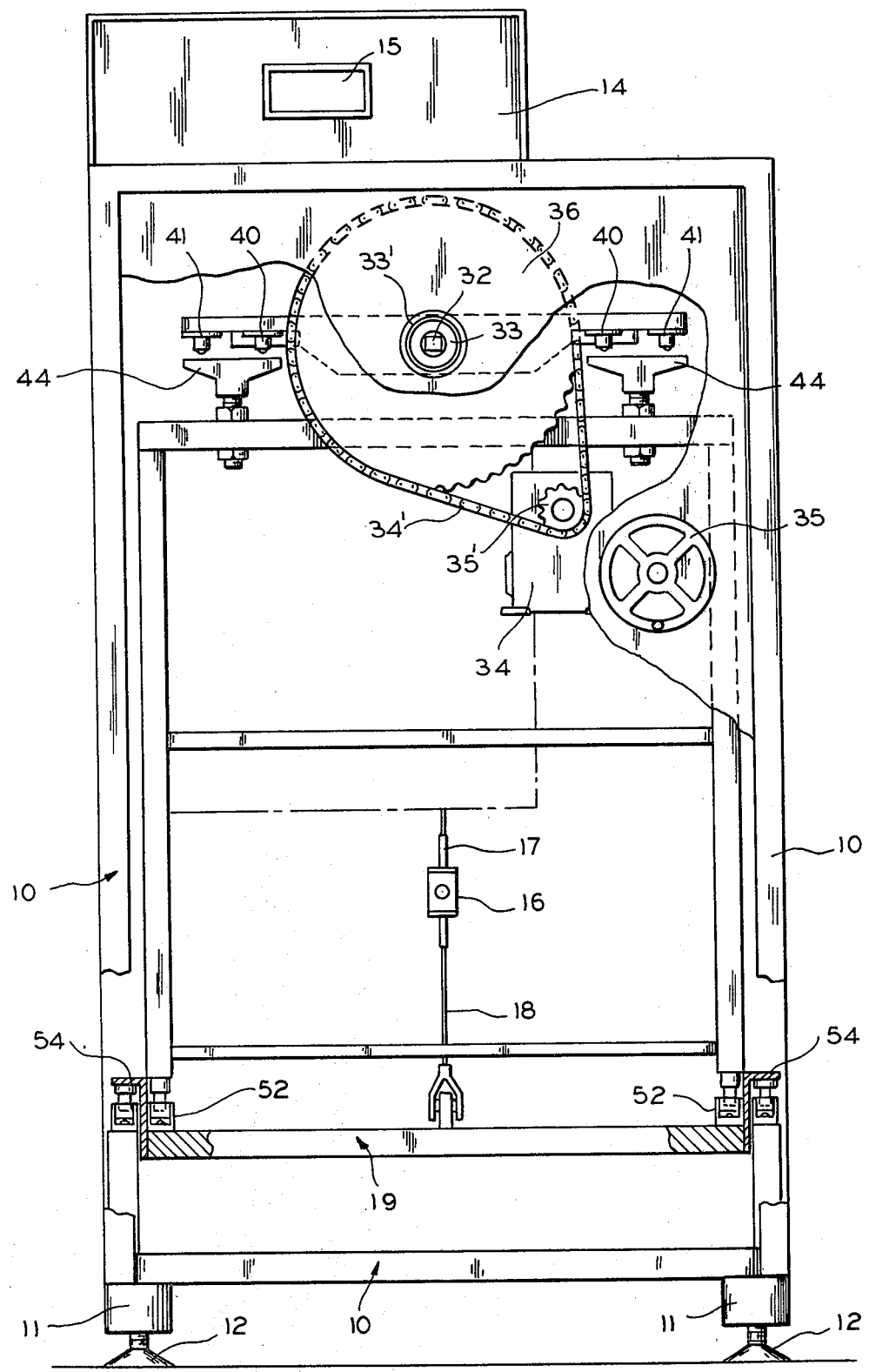

FIG. 6 is a sectional view in elevation taken substantially along line V—V of FIG. 5.

The structure selected for illustration is not intended to serve as a limitation upon the scope or teachings of the invention, but is merely illustrative thereof. There may be considerable variations and adaptations of all or part of the teachings thereof depending upon the dictates of commercial practice. The present invention comprises a base 10 which is supported by corner standards 11 which have floor leveling feet 12 to support a flat level surface 13 (FIG. 5) on which an appropriate measuring instrumentality such as a suitable and standard platform weighing scale 14 is mounted. The platform scale 14 should be of the type that preferably though not essentially has an illuminated calibrated viewing dial 15 with multiple measuring systems impressed thereon (not shown) corresponding and responsive to the controlled and indexed positioning of the multiple support fulcrum carriage to be hereinafter described. The platform weighing scale 14 is provided with the usual self-compensating weight instrumentalities (not shown) to enable initial balancing of the instrumentalities to bring the platform weighing scale 14 to its initial zero reading. This type of platform weighing scale 14 and the transducer 16 are conventional and in commercial use. The transducer 16 (FIG. 5) is operatively connected in series with the platform weighing scale 14 through tensile linkage 17–18 for operative connection to the substantially U-shaped multiple fulcrum bearing mount support crade 19 which is pivotally mounted as at 29–30 relative to the frame 10 for support by the tensile linkage 17–18 operatively extending through a transducer 16 to the measuring instrumentalities of the weighing scale 14 (FIGS. 3 and 5) which is movably mounted relative to the frame 10.

The transducer 16 is an electronic measuring check device which is in series with the measuring instrumentalities of the platform weighing scale 14 through the tensile linkage 17–18 for comparative load reading with the calibrated meter 20 of the measuring instrument such as the torque wrench 21 under test. A rectangularly shaped collar 22 having a slide guide bore 22' at one end thereof with a threaded positioning stud 23 (FIGS. 4 and 5), envelops the free end of the measuring instrument holder bar 24 for slidable adjustment therealong. The holder bar 24 has a split bearing bracket 25 for attachment to the measuring instrument holder bar 24 at one end 26 and to a hollow bearing sleeve 27 as at 28 to hold the measuring torque load wrench 21 in position around the sleeve 27–28 to impress its load on the multiple fulcrum mount cradle 19 which registers the load both on the platform weighing scale 14 and transducer 16. The rectangularly shaped collar 22 also has a torque wrench handle receiving opening 22" therein to slip over the torque wrench handle 21' for retaining the latter in its testing position while its work engaging member is operatively connected to the female socket 32 of the extension 33 of the shaft 37 (FIG. 5).

The fulcrum bearing mount cradle 19 in the diagrammatic illustration to demonstrate and clarify the relative functional movement of the basic parts (FIG. 3) is pivotally mounted as at 29–30 to a bearing mount vertically fixed member 31 welded or otherwise attached to the bottom frame 10 (FIG. 5). In the preferred embodiment, however, the tiltable cradle 19 is supported by fulcrum mounts attached to bars 54–54' (FIG. 5). These fulcrum mounts in turn support the elongated standards 48–49 having fulcrum mounts 50–52 and 51–53 at their lower ends for attachment to the cradle 19 (FIG. 4). The elongated standards 48–49 are retained and rest in their fulcrum mounts 50–52 and 51–53 by their own weight to maintain attachment and contact at all times between their fulcrums and mounts 50–52 and 51–53 while being shifted and displaced at their upper ends 44–45 for reaction with properly spaced fulcrum mounts 40–41–42 serving as contacts to transmit the applied load responsive to being positioned by the indexed control lever 56 and its connected linkage 60, 61, 64, and 65 (FIG. 4). This linkage is adjustable to vary the ratio input torque to the force applied to the measuring instrumentalities 14 and 16 so that torque wrenches 21 of varying capacity or calibrated with different measuring scales or systems may be tested so long as the multiple scales on the measuring instrumentality 14 provide therefor with the teachings of the present invention.

In essence, the fulcrum mounts 44–45 are confrontable in pairs with their counterparts 40–41–42 (FIG. 4) through the displacement of the standards 48–49 responsive to the actuation of the linkage 60 to 65 operative by the control lever 56 that cooperates with the position indexing element 57 fixed to the front panel 58 of the frame 10 (FIG. 1). In the present embodiment multi-positioning corresponds with the multiple scales inscribed on the scale dial 15 of the measuring instrumentality 14. These confrontable fulcrums serve as contacts to transmit the applied load under test to the desired measuring scale on the dial 15 comparable to the calibrated scale 20 on the measuring device 21 under test (FIG. 2). This affords an accuracy test and enables a tester to be utilized on a greater number of differently calibrated devices. With this arrangement, the torque wrench under test is held fast around the axial sleeve 27 for registry of its male work engaging member with the female socket 32 fixed to an extension 33 of a central fulcrum carriage shaft 37 journalled within the axial sleeve 27. In order to provide smooth and adequate torque wrench loading capability, a gear reducer 34 and hand wheel assembly 35 is provided (FIG. 6). When pressure is applied to the hand wheel, the turning force is applied to the gear reducer input. The gear reducer greatly increases the force and reduces the rate of motion. The output drive sprocket pinion 35' of the reducer 34 is connected by chain drive 34 to the main drive sprocket 36 which is attached to the sleeve 27. The sprocket pinion 35' drives the sprocket 36 through the meshing chain 34' in operative connection with the hand wheel 35 (FIG. 5). A sprocket pinion 35' drives the sprocket 36 through a meshing chain 34' in operative connection with the hand wheel 35 (FIG. 5).

The main drive sprocket 36 is connected to the torque wrench loading arm by a bearing sleeve 27. The assembly consisting of the main drive sprocket 36, bearing sleeve 27, and loading arm 24 rotates on and is guided by two sets of ball bearing raceways 32' seated in the main support sleeve 33' (FIG. 5). The main support bearing 33' is rigidly fixed to the tester frame 10. The loading arm axis of rotation is the same as that of the torque wrench work engaging member constituting the drive 32' while under test. This allows the contact point between the loading arm guide rod 24, sleeve 22, and the torque wrench handle 21' to remain the same as the load is applied during testing (FIG. 2). This peripheral loading system also allows tests to be performed in two vertical and two horizontal positions depending on the wrench position determined by the angular registry between the square male work engaging member 32' and the female socket 32 formed integral with the shaft 37 which is the central frame assembly of the multiple fulcrum support carriage 33 to be more fully described hereinafter.

In order to conform the sheet results with the various calibrated torque measuring wrenches such as but not limited to foot pounds, inch pounds or Newton Meters or to various capacities of such wrenches for more accurate testing thereof, a shiftable fulcrum carriage 33 is provided. To this end, the female socket 32 registers with and receives the male work engaging member 32' projecting from the torque measuring wrench 21 (FIG. 2), is provided with the elongated central shaft 37 (FIG. 3) which is journalled in the support bearing 33' proximate to its forward female socket 32. The shaft 37 terminates in a rearward bearing 38 rotarily supported in a bearing bore 39 provided in a depending standard 40' attached to the frame 10 (FIG. 5). A plurality of balancing cross-members carriage fulcrum balancing mounts 40, 41 and 42, in this instance three, are are mounted on to shift along the carriage shaft 37 to comprise part of a diagrammatically illustrated multiple support fulcrum carriage 42' (FIG. 3). These balancing fulcrum mounts 40, 41 and 42 have depending fulcrum support nibs 43 at each end thereof, in this instance six, to cooperate with correspondingly spaced fulcrum bearing pads 44-45 provided on the upper surfaces of alternately spaced fulcrum struts 46-47, in this instance two, disposed below for guided displacement along the elongated central fulcrum carriage shaft 37. The carriage pads 46-47 have elongated standards 48-49 depending therefrom to provide depending fulcrums 50-51 thereon to confront and react with bearing pads 52-53 fixed to the pivotal cradle 19 and spaced thereon to conform with the spacing of the elongate depending knife edge support standards 48-49. These elongated sulcrum support assembly standards 48-49 are properly spaced and braced relative to each other by rigid spacer rods 54-55 so that they are shiftable together for selective transfer to different fulcrums 40-41 and their respective fulcrum bearing pads 44-45 at the top ends or 52-53 at their bottom ends as will appear more fully hereinafter.

The output of the torque wrench 21 to be tested with its male work engaging member is applied to the fulcrum carrier shaft 33 through the female square attachment 32. The load is then transferred in either the clockwise or counterclockwise direction through the input carrier loading arms 40-41 to the fulcrum loading pad standard 48 or through input loading arm 42 to the fulcrum loading pad standard 49. The lower load transmitting cradle 19 which is pivoted and fulcrum balanced as at 54' (FIGS. 5 and 6), then transfers this load through the cable 17-18 and transducer 16 which are in series and operatively connected to the weighing scale mechanism 14-15. The unit selector to be hereinafter described, positions the knife edge fulcrum standards 48-49 in proper reference with respect to the input loading arms 40-41. A linkage assembly connects the unit selector with the fulcrum loading standard 49. Swivel linkage rods 54-55 are attached between the two fulcrum loading standards 48-49 to keep them in proper spaced relative position. In the illustration, the unit selector is in the lowest position (FIG. 5). The knife edge loading standards 48-49 are in a position closest to the front of the tester. The fulcrum loading standard 48 is engaged with the input loading arm 40. This is the pound foot position. These multiple fulcrum load transmitting elements are in suspended floating balance for shiftable support and displacement by an indexed selector control lever and linkage to be hereinafter described.

With the unit selector moved upward to second position, both fulcrum loading standard 48-49 move toward the rear of the tester. Fulcrum loading standard 48 disengages from input loading arm 40 and engages with input loading arm 41. Fulcrum loading standard loading 49 has moved to the rear toward input loading arm 42, but is not engaged with it. This is the Newton Meter position. With the unit selector moved into the highest position, both fulcrum loading assembly standard 48-49 move toward the rear. Fulcrum loading pad 48 disengages from input loading arm 41, fulcrum loading standard 49 has moved to the rear and becomes engaged with input loading arm 42. This is the proud inch position.

These relative positions of the fulcrum assembly standards 48-49 with respect to their fulcrums 50-51 and bearing pads 52-53 (FIG. 5) are controlled by a selector arm 56 which extends through a vertical slot 57 in the front panel 58 covering the frame 10 (FIG. 1). The vertical slot 57 is stepped to retain the lever 56 in anyone of three adjusted positions. It is pivoted to a frame member as at 58 to present an apertured extremity 59 to which a rod 60 is attached. The rod 60 pivotally engages a right angled lever 61 which in turn is pivoted to a frame member as at 63 to displace an arm 64 through a link 65. The arm 64 is attached to the standard 49 for selected displacement responsive to the position of the selector arm 61 in the desired indexing thereof in anyone of the three-stepped positions of the vertical slot 57 provided in the front panel 58 of the frame 10 (FIG. 1). It should be observed that each step of the slot 57 is indexed for foot pounds, inch pounds and Newton's Meters, but can also be indexed for three different torque wrench capacities. For instance, the present design contemplates capacities of one thousand (1000) foot pounds, 1000 Newtons Meters, and 1000 inch pounds. Using the same mechanical ratios, it is possible to produce a tester of two or three times these capacities, that is 2000 foot pounds, 2000 Newton Meters and 2000 pound inches. This would only require a change in the tester scale head and the optical reading scale measuring system calibration thereof.

One of the important aspects of this preferred embodiment of the torque wrench tester design is its ability to test torque wrenches at different angles. Some torque wrenches are affected differently depending on the angle of use for accuracy purposes. It should be noted that this tester has a loading arm device which may be rotated to any radial position such as vertical, horizontal, or any angle therebetween so that torque wrench performance may be compared at different angles to simulate actual working conditions in its wide field of use.

In short, the loading device consists of a gear reducer 34, a hand wheel 35, a drive chain 34', a sprocket wheel 36, and a torque wrench head mount assembly 32 supported by suitable bearings 32' which rotate on the same axis as the output drive of the particular torque wrench being tested. The loading system has the advantage of retaining the same loading point position regardless of swing position because both loading device and torque wrench swing about and through the same axis for angular test positioning. Spaced bearings 32' are mounted inside this support bearing 33'. The loading arm 21, connecting tube 22 and sprocket 36 swing on these bearings. The gear reducer 34 feeds the loading arm 21, the chain 34' and the sprocket 36. This is accomplished by manually turning the wheel 35'.

An important aspect thereof is its ability to test in different multiple units of measurement, of for torque wrenches of different capacities can be tested with the same device and comparisons made therewith within their most accurate range limits. While the elongated fulcrum bearing mount standards 48–49 are maintained in rigid spaced relation proximate to their upper ends by the rods 54–55, the lower most fulcrums 50–51 never are separated from their bearing mounts 52–53 (FIG. 5). Thus, the selector control lever 58 with its linkage 60–61–65 is effective to displace the bearing mounts 44–45 relative to the multiple carrier fulcrum nibs 43 on the (FIG. 3) carrier plates 40–41–42 (FIG. 5) that are properly spaced relative to each other to accomplish the different scale reading calibrations on the weighing scale 14.

The particular tester shown measures 0–1000 foot pounds, or 0–1000 inch pounds, or 0–1000 Newton Meters. A single measuring head is used and the multiple units are selected by changing mechanical linkage inside the tester. The mechanical linkage is changed with the positioning leveror selector arm 61 outside the tester panel 58.

Twelve (12) inch pounds equals One (1) foot pound. Also, Two (2) foot pounds equals 1.3559 Newton Meter. The linkage "set up" inside the tester accomplishes this mathematical change so that the same test head may be used for the three units of measurement. The theory of operating would allow additional units of measurement to also be combined within the same tester depending upon the dictates of commercial practice.

FOOT POUND MEASUREMENT

To illustrate, apply One Hundred (100) foot pounds to input square drive. Fulcrum pad 48 is swung under input loading arm 40. Lever length of arm 40 is twelve (12) inches or one (1) foot. Therefore, one hundred (100) foot pounds applied at input drive results in one hundred (100) foot pounds of applied pressure from arm 40 to pad 48. Pad 48 transmits this one hundred (100) pound pressure to fulcrum 50 which forms part of lower transmitting beam section.

The ratio of fulcrum 50 to distance 18 (line of pull on the platform scale 14) working from pivot 54 is 10:1. Therefore, the downward force applied at the tester head is ten (10) foot pounds.

The tester head vision dial 15 always converts force to a reading ten (10) times higher. Therefore, with ten (10) foot pounds applied, the tester reads (100).

The result is that one hundred (100) foot pounds of applied torque produces a reading of one hundred (100) when loading arm 40 is engaged with loading pad 48.

NEWTON METER MEASUREMENT

One Hundred (100) foot pounds equals 135.59 Newton Meter.

To obtain direct tester readings in these units of measurement, the mechanical ratio must be changed. Loading pad 48 will now be shifted from loading arm 40 and will be engaged under loading arm 41. Loading arm 41 is a reduced length compared to 40 so that the pressure is increased 1.3559 times more than that which was applied in the foot pound mode of operation.

Therefore, One Hundred (100) Newton Meter's torque applied to the input square drive results in One Hundred (100) pounds pressure being applied from loading arm 41 (which is 8.85 inches long) to fulcrum loading pad 48. The ratio of 50 to 18 working from pivot 54 is 10:1. Therefore, the downward force applied at the tester head is ten (10) pounds.

The tester head dial 15 always converts force to a reading ten (10) times higher, therefore, with ten (10) pounds applied, the tester read One Hundred (100). One Hundred (100) Newton Meter applied to input drive results in reading of One Hundred (100) on the tester head dial 15.

INCH POUND MEASUREMENT 8.333 FOOT POUNDS = One Hundred (100) Inch Pounds

To obtain direct tester readings in this unit of measurement, the total ratio must be increased twelve (12) times over that required for foot pound readings (twelve (12) inch pounds equals one (1) foot pound.

Fulcrum loading pad 48 will be disengaged and will not be used. Knife edge loading pad 49 will be engaged under loading arm 42. One Hundred (100) inch pounds applied to input drive 32 will produce a pressure of twenty (20) pounds at loading pad 49 if lever length of loading arm 42 is 5 inches.

Ratio 51 to 18 is 2:1 working from pivot 54; therefore, the downward force applied to the tester head is ten (10) pounds.

The tester head dial 15 always converts force to a reading ten (10) times higher; therefore, with ten (10) pounds applied, the tester read One Hundred (100).

One Hundred (100) inch pounds of torque applied to the input drive results in a reading of one hundred (100) on the tester head dial 15.

OTHER COMPONENTS

The input square drive 32 and shaft 37 is journalled in two support bearings 32' which are in the front section (FIG. 4) inside the main support sleeve tube 33'. One bearing 39 supports the shaft 37 at the rear. The input loading arm 21 which is the torque wrench under test, connects to the square female portion 32 of the main shaft 37.

A additional readout device normally termed a transducer 16 is incorporated herein in service with the scale 14. This is a digital readout device 16. It reads in series with the tester head dial 15 and may be compared with it. It reads 0–1000 in steps of 0.1.

The illustration in FIG. 3 is a figurative diagrammatic perspective view to clarify the showing of the fulcrum carriage 19 and its related elements that do not necessarily resemble the per se the linkage embodied in the device itself. It is more easily understood to utilize the diagrammatic physical showing of FIG. 3 rather than attempt a literally accurate representation in a congested assembly view of the device depicted by FIG. 4. Therefore, instead of showing the transducer 16 of FIG. 4, the conventional perspective view illustrates a forceful guage 16' which is similar in purpose and constitutes a mechanical rather than an electrical measuring device more applicable to the fulcrum carriage conventional illustration of FIG. 3.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. A self-contained measuring and testing device comprising a frame, a calibrated measuring instrumentality with multiple scales to register the load applied by a single scale calibrated work engaging device under test, said work engaging device being calibrated to correspond with one of said multiple scales on said measuring instrumentality, loadable means on said frame to receive said calibrated work engaging device for applying a load to a selected scale on said calibrated measuring instrumentality, fixed multiple sets of fulcrums on said frame, displaceable fulcrum complements on said frame to confront different sets of sid fixed fulcrums, and moveable linkage connected to said displaceable fulcrum complements to effect the shifting thereof to confront different sets of fixed fulcrums to vary the ratio of input load applied by said calibrated work engaging device to said multiple calibrated measuring instrumentality so that calibrated work engaging devices of varying calibrations may be tested against a corresponding scale on said multiple scale calibrated measuring instrumentality to check the accuracy of said calibrated work engaging device.

2. A mechanism defined in claim 1 wherein an index selector is operatively connected to said moveable linkage to translate said displaceable fulcrum complements to their proper position relative to said fixed fulcrums to match the calibrated work engaging device under test with a corresponding scale on said measuring instrumentality.

3. A mechanism defined in claim 2 wherein said index selector cooperates with position stops for each scale on said multiple scale, calibrated measuring instrumentality to insure accurate testing comparisons with the calibrated work engaging device under test.

4. A mechanism defined in claim 2 wherein the displaceable fulcrum complements are fixed to standards that move responsive to said linkage operatively connected thereto to selectively confront certain of said fixed set of fulcrums.

5. A mechanism defined in claim 4 wherein said standards are supported on fixed fulcrum mounts to swing said displaceable fulcrum complements in selective confronting relation with said fixed fulcrums responsive to said linkage.

6. A mechanism defined in claim 2 wherein said fixed sets of fulcrums and displaceable fulcrum complements are spaced relatively to each other to provide scale readings of different values relative to the turning of said loadable means on said frame responsive to the application of force upon said work engaging device.

7. A mechanism defined in claim 6 wherein said loadable means are journalled on said frame for turning in a clockwise or counterclockwise direction to test an applied calibrated work engaging device for comparison with the scale corresponding thereto on the measuring instrumentality.

8. A mechanism defined in claim 7 wherein the selector positions the linkage that in turn displaces the standards to properly maintain the setting between certain of said fixed frame fulcrum complements and moveable standard fulcrums.

9. A mechanism defined in claim 7 wherein said index selector cooperates with position stops for each scale on said multiple scale calibrated measuring instrumentality to insure accurate testing comparisons with the calibrated work engaging device under applied load tests.

10. A mechanism defined in claim 5 wherein said index selector cooperates with position stops for each scale on said multiple scale calibrated measuring instrumentality to insure accurate testing comparison with said calibrated work engaging device under applied load tests.

11. In a measuring and testing device, the combination with a frame, of a calibrated measuring instrumentality having multiple scales thereon to register the turning load applied by a single scale calibrated work engaging device under test, said work engaging device being calibrated to correspond with one of said multiple scales on said measuring instrumentality, rotary loadable means on said frame to receive said calibrated work engaging device for applying a load to register on a selected scale on said calibrated measuring instrumentality, fixed and moveable contacts operatively effective between said loadable means and said calibrated multiple scale measuring instrumentality to transmit the applied load of said calibrated work engaging device to register on said multiple scale calibrated measuring instrumentality, and control means for selectively matching said fixed and moveable contacts to properly transmit the applied rotary load impressed by said calibrated work engaging device to a corresponding scale on said multiple scale calibrated measuring instrumentality so that differently calibrated work engaging devices with calibrations corresponding to one of said multiple scales on said calibrated measuring instrumentality may be tested thereon for accuracy.

12. A mechanism defined in claim 11 wherein a plurality of said fixed and moveable controntable contacts selectively react responsive to setting said control means to register an applied turning load on selected scale of said calibrated measuring instrumentality corresponding to the scale of said calibrated work engaging device under test.

* * * * *